United States Patent
Galloway

(10) Patent No.: US 9,116,764 B2
(45) Date of Patent: Aug. 25, 2015

(54) BALANCED PSEUDO-RANDOM BINARY SEQUENCE GENERATOR

(75) Inventor: Brian Jeffrey Galloway, Hoschton, GA (US)

(73) Assignee: Conversant Intellectual Property Management Inc., Ottawa (CA)

( * ) Notice: Subject to any disclaimer, the term of this patent is extended or adjusted under 35 U.S.C. 154(b) by 2351 days.

(21) Appl. No.: 11/873,330

(22) Filed: Oct. 16, 2007

(65) Prior Publication Data

US 2008/0263116 A1    Oct. 23, 2008

Related U.S. Application Data

(60) Provisional application No. 60/912,307, filed on Apr. 17, 2007.

(51) Int. Cl.
*G06F 7/58*        (2006.01)
(52) U.S. Cl.
CPC . *G06F 7/58* (2013.01); *G06F 7/584* (2013.01)
(58) Field of Classification Search
None
See application file for complete search history.

(56) References Cited

U.S. PATENT DOCUMENTS

| | | | |
|---|---|---|---|
| 5,530,390 A | * | 6/1996 | Russell ............... 327/164 |
| 5,825,824 A | | 10/1998 | Lee et al. |
| 7,124,158 B2 | | 10/2006 | Ruthstein et al. |
| 2005/0179570 A1 | | 8/2005 | Yagi et al. |

OTHER PUBLICATIONS

Edward J. McClusky, Logic Design Principles With Emphasis on Testable Semicustom Circuits, 1986, pp. 456-461, Prentice Hall, Englewood Cliffs, NJ.
Jian Ren et al., Design of Pseudo-Random Spreading Sequences for CDMA Systems, 2004, pp. 775-779, IEEE Communications Society, Globecom 2004.
Maxim Integrated Products, Pattern Creator/Converter Software User Manual, Aug. 2004, pp. 1-8, Maxim High-Frequency/Fiber Communications Group.

* cited by examiner

*Primary Examiner* — Michael D Yaary
(74) *Attorney, Agent, or Firm* — Kenneth Liu

(57) ABSTRACT

Disclosed is a method for producing, in an electronic circuit, a varying digital output in response to edges of a received clock signal. The method includes generating, within circuitry of the electronic circuit, an unbalanced, pseudo-random binary output of the circuitry. The method also includes generating, within the electronic circuit and from the received clock, a sub-rate clock version of the received clock. The method also includes carrying out, within the electronic circuit, an exclusive OR operation between the sub-rate clock and the pseudo-random binary output of the circuitry to produce a balanced, pseudo-random binary output.

20 Claims, 4 Drawing Sheets

BALANCED PSEUDO-RANDOM BINARY SEQUENCE GENERATOR

CROSS-REFERENCE TO RELATED APPLICATIONS

This application claims the benefit of U.S. Provisional Application No. 60/912,307, filed Apr. 17, 2007, the contents of which are incorporated herein by reference in their entirety.

BACKGROUND OF THE DISCLOSURE

The ability to generate pseudo-random binary sequences within electronic systems such as, for example, data converter systems and systems employing communications circuits, can be useful. Unfortunately, a problem with some known Pseudo-Random Binary Sequence (PRBS) generators is that they generate a sequence that is unbalanced. As will be appreciated by those skilled in that art, the use of an unbalanced binary sequence in conjunction with operations on data signals may introduce error into resultant data signals. The amount of error that is introduced may, in some cases, be unacceptable.

SUMMARY

It is an object of the invention to provide an improved binary sequence generator.

According to one aspect of the invention, there is provided an electronic circuit for producing a digital output in response to edges of a received clock signal. The circuit includes first generator circuitry for generating an unbalanced, pseudo-random binary output of the first circuitry. Second generator circuitry has an input for the received clock signal. The second circuitry generates a sub-rate clock version of the received clock. Logic gate circuitry effectively multiplies the sub-rate clock with the pseudo-random binary output of the first circuitry to produce a balanced, pseudo-random binary output.

According to another aspect of the invention, there is provided a method for producing, in an electronic circuit, a varying digital output in response to edges of a received clock signal. The method includes generating, within circuitry of the electronic circuit, an unbalanced, pseudo-random binary output of the circuitry. The method also includes generating, within the electronic circuit and from the received clock, a sub-rate clock version of the received clock. The method also includes carrying out, within the electronic circuit, an exclusive OR operation between the sub-rate clock and the pseudo-random binary output of the circuitry to produce a balanced, pseudo-random binary output.

According to yet another aspect of the invention, there is provided an electronic circuit for producing a digital output in response to edges of a received clock signal. The circuit includes first generating means that generates, within the electronic circuit, an unbalanced, pseudo-random binary output. Second generating means generates, within the electronic circuit and from the received clock, a sub-rate clock version of the received clock. The circuit also includes means for carrying out, within the electronic circuit, an exclusive OR operation between the sub-rate clock and the pseudo-random binary output to produce a balanced, pseudo-random binary output.

Thus, improved binary sequence generators have been provided.

BRIEF DESCRIPTION OF THE DRAWINGS

Reference will now be made, by way of example, to the accompanying drawings.

DETAILED DESCRIPTION OF EXAMPLE EMBODIMENTS

Figure 1:
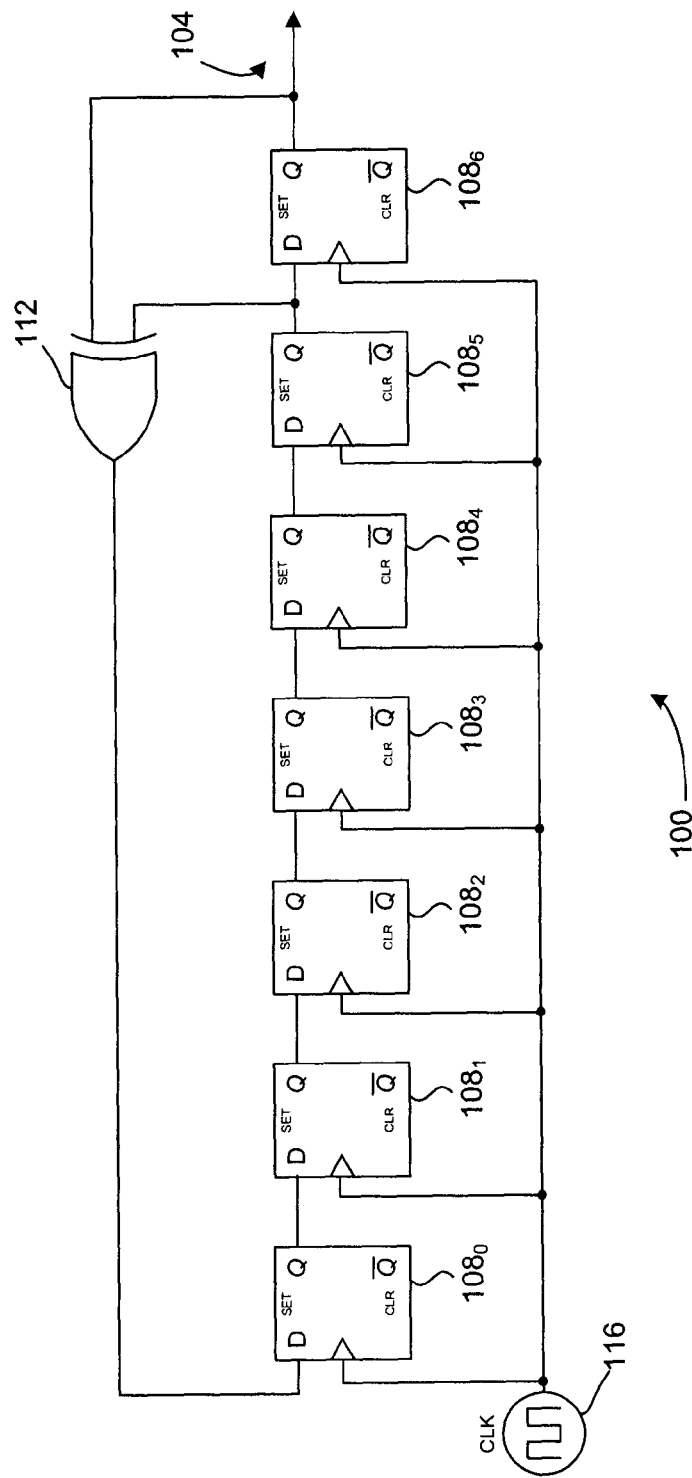
FIG. 1 is a circuit schematic representation of a prior art Pseudo-Random Binary Sequence (PRBS) generator.

"Balanced", as the term is used herein, refers to balance of odd/even sequences and/or (depending on the context) balance of logic high and logic low levels in a sequence. In some examples, logic high and logic low map onto '1' and '0' respectively. In some alternative examples, logic high and logic low map onto '+1' and '−1' respectively.

In the following detailed description of example embodiments, a number of illustrated circuits, and circuit components and/or logic gates are of a type which performs known operations on electronic signals. Those skilled in the art will have knowledge of alternative circuits, circuit components or logic gates which are recognized as equivalent because they provide the same operations on the signals.

Similar or the same reference numerals may have been used to denote similar components.

Referring now to the drawings, FIG. 1 is a circuit schematic representation of a PRBS generator 100. The generator 100 generates an unbalanced binary sequence at circuit output 104. In connection with the generation of the unbalanced binary sequence at the circuit output 104, individual bits of the binary sequence are outputted sequentially at each trigger event (i.e. the clock edge).

The illustrated generator 100 comprises generator circuitry that includes seven D flip-flops, labeled $108_0$-$108_6$. As will be appreciated by one skilled in the art, the number of D flip-flops 108 will vary. For example, there could be many more D flip-flops 108, or there could be as few as three D flip-flops 108. However, as will be understood by those skilled in the art, the imbalance of the generated binary sequence will be greater in those generators where there are fewer flip-flops 108. Conversely, one benefit of having fewer flip-flops 108 would be reduced number of transistors required for implementation.

The imbalance of the generated binary sequence relates to the all logic lows state (all zeros state or all −1's state) being disallowed. As explained in Chapter 10 of "Logic Design Principles", McCluskey, Edward, Prentice Hall, © 1986, the all logic lows state must be disallowed for the generator 100, because once in the all logic lows state, the generator 100 will be indefinitely stuck in that state. Initialization circuitry [not explicitly shown] may be employed, upon initialization of the generator 100, to set at least one of the D flip-flops 108 to logic high (logic '1'). It will be therefore be understood that, because the all logic lows state is disallowed, there will always be an imbalance of odd/even sequences. The imbalance is roughly one divided by $2^N$, where N is the number of D flip-flops in the generator 100. Thus, the imbalance is inversely related to the number of D flip-flops.

It will be understood that the D flip-flops 108 are in a shift register-type arrangement and, more specifically, a Linear Feedback Shift Register (LFSR) type arrangement. In particular, the D input of each flip-flop 108 (except the first D flip-flop) is connected to the Q output of the previous D flip-flop 108. The output of the last D flip-flop, D flip-flop $108_6$, is electrically connected to an input of XOR logic gate 112. Also, the other input of the XOR logic gate 112 is electrically connected to the Q output of the second last D flip-flop, D flip-flop $108_5$. The D input of the first D flip-flop, D flip-flop $108_0$, is electrically connected to the output of the XOR logic gate 112.

A clock signal 116 is received at a clock input of each of the D flip-flops 108. For the illustrated generator 100, the bit values on the D inputs of each of the D flip-flops 108 are outputted on the Q outputs of the flip-flops on the rising edges of the clock signal 116. Nevertheless, it will be understood that in other PRBS generators, other flip-flop triggering events may be possible. For example, triggering the flip-flops on the falling rather than rising edges of a clock signal may be possible.

Figure 2:
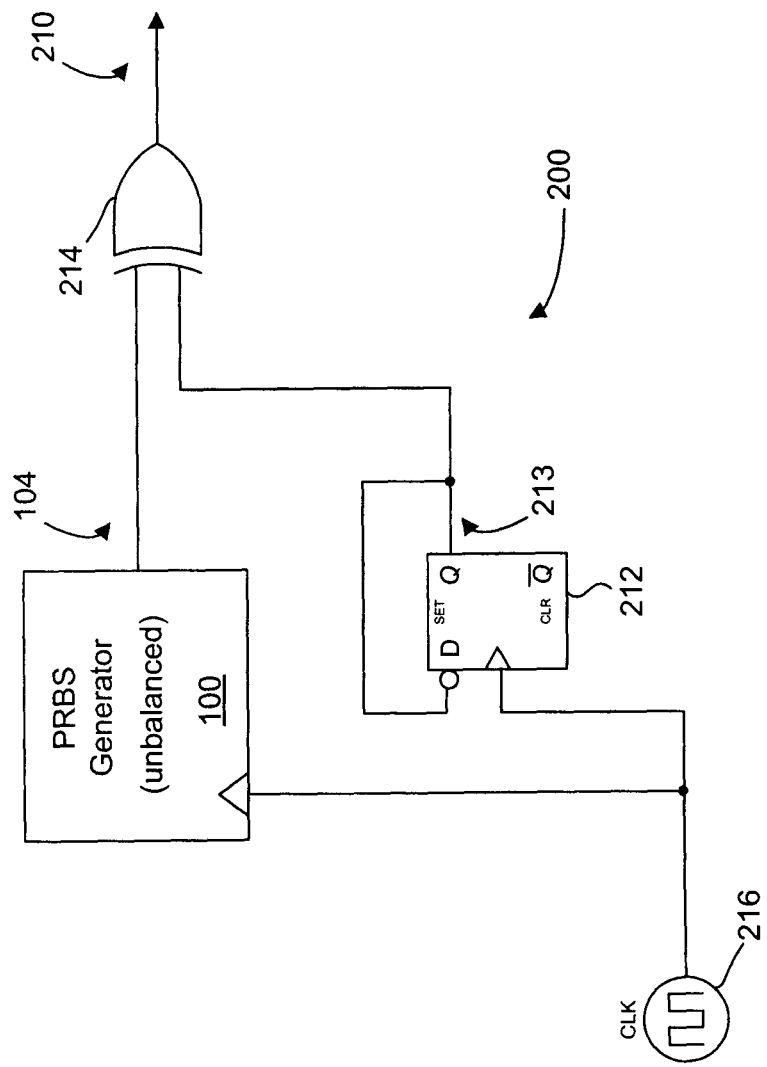
FIG. 2 shows a circuit diagram of a balanced PRBS generator in accordance with a first example embodiment.

Reference will now be made to FIG. 2. FIG. 2 shows a circuit diagram of a balanced PRBS generator 200 in accordance with a first example embodiment. As will be subsequently explained, the generator 200 generates, at circuit output 210, a balanced pseudo-random binary sequence by effectively multiplying an unbalanced pseudo-random binary sequence with a balanced sequence generated by a separate generator.

The illustrated generator 200 employs the unbalanced sequence generator 100 described previously in greater detail, and also a balanced sequence generator comprising generator circuitry that includes a D flip-flop 212. The D flip-flop 212 configured as illustrated is sometimes referred to as a divide-by-two circuit. This is because it outputs a signal that oscillates at a frequency that is ½ the frequency of the clock signal received at the clock input of the flip-flop. One skilled in the art will appreciate that other circuitries besides a D flip-flop could be used to implement a divide-by-two circuit. For example, a T flip-flop could be used to implement a divide-by-two circuit.

As explained previously, the imbalance in the sequence outputted at the unbalanced generator output 104 is roughly $\frac{1}{2}^N$ (where N=7) or roughly 1%. By contrast, the sequence outputted at the output 213 of the generator 212 should have zero imbalance, because the illustrated generator 212 is a divide-by-two circuit that generates an oscillating output signal having a 50% duty cycle (logic high 50% of the time, logic low 50% of the time). The unbalanced and the balanced sequences are effectively multiplied together to generate a balanced sequence at the output 210 of the generator 200. This is carried out by providing each of the sequences at one and the other of the two inputs of XOR logic gate 214. In particular, a new bit from each of the generators 100 and 212 will be provided to the XOR gate inputs each cycle of clock signal 216.

Advantageously, the binary sequence generated at the output 210 exhibits the combined characteristics of each of the two generators 100 and 212. In other words, the binary sequence generated by the generator 200 (like the binary sequence generated by the generator 100) will be pseudo-random but with the imbalance eliminated. This can be explained mathematically as follows: the expected value of two relatively-prime sequences multiplied together, one of which is zero mean, will result in a sequence that is zero mean itself. Furthermore, those skilled in the art will appreciate that in systems where logic high and logic low map onto '1' and '−1' respectively, it is a common understanding that XOR gates can be used in effectively achieving multiplication.

In addition to imbalance, two other measures sometimes referred to in connection with sequence generators are mark density and transition density. Mark density is calculated as follows: 100%*(number of logic '1''s/total bits). Transition density is calculated as follows: 100%*(number of bit transitions/total number of bits). Balanced PRBS generators in accordance with example embodiments have a mark density of 50% and a transition density of, for practical purposes, at least close to 50%.

Figure 3:
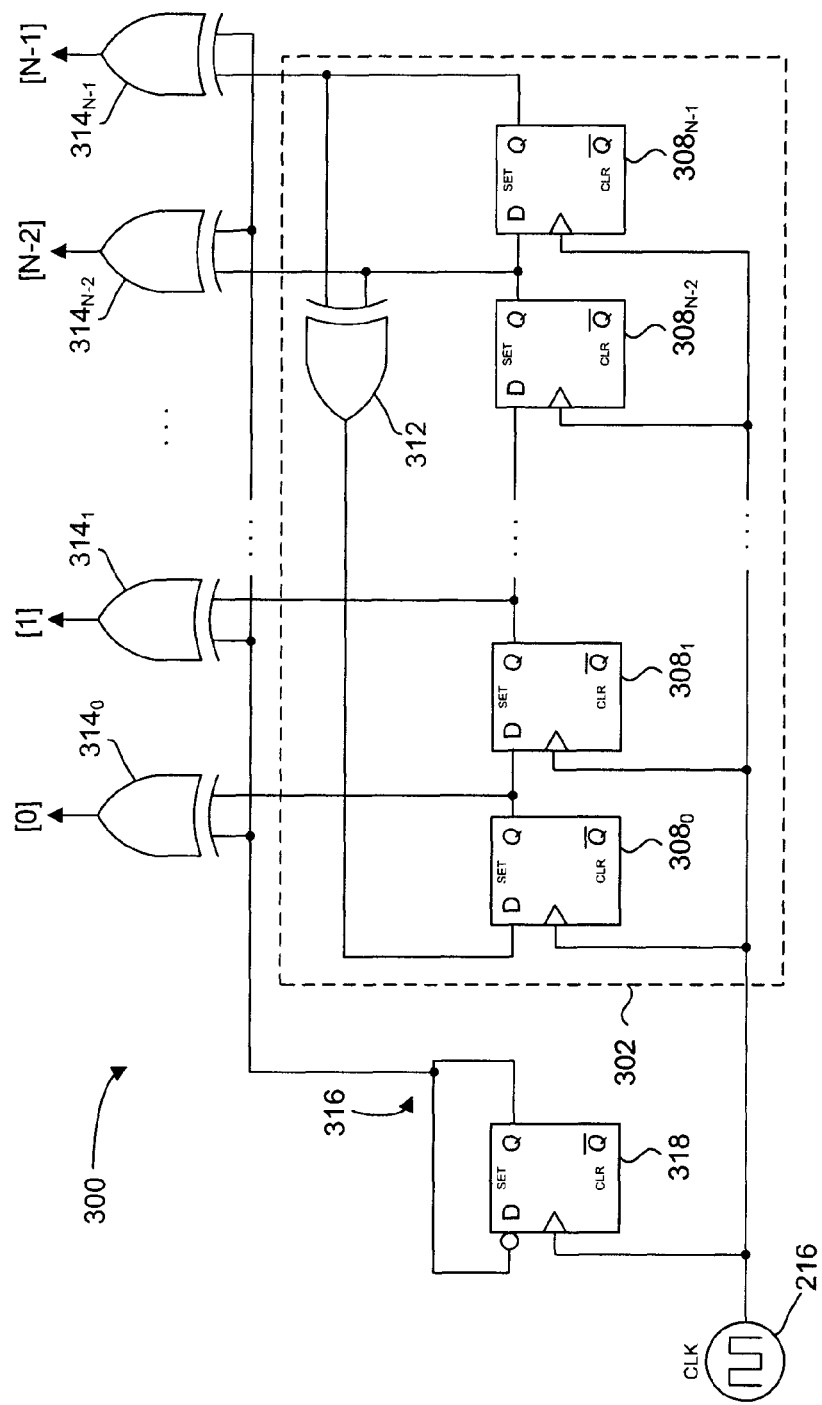
FIG. 3 is a circuit schematic representation of a balanced PRBS generator in accordance with another example embodiment.

Reference will now be made to FIG. 3. FIG. 3 is a circuit schematic representation of a balanced PRBS generator 300 in accordance with another example embodiment. The generator 300 is similar to the generator 200 illustrated in FIG. 2, the primary difference between the two generators being that the generator 300 generates a pseudo-random word of length N rather than a pseudo-random sequence of bits where at any one instance only one bit is provided at the output of the generator.

Unbalanced PRBS generator 302 of the generator 300 comprises generator circuitry that includes N D flip-flops $308_0$-$308_{N-1}$ and an XOR logic gate 312. These components are electrically connected together in a manner similar to the components of the generator 100 shown in FIG. 1; however, a Q output for each of the flip-flops 308 is connected to an associated one of XOR logic gates $314_0$-$314_{N-1}$. The other input of each of the XOR logic gates $314_0$-$314_{N-1}$ receives a Q output 316 of a balanced generator 318 that is a generator comprising generator circuitry at least similar to the circuitry of the balanced generator shown in FIG. 2. Consequently, in the generator 300 there are N instances of multiplications that occur between each of the Q outputs of the flip-flops 308 and the output of the balanced generator 318, whereas in the generator 200 (FIG. 2) there is only one multiplication between the output 104 of the unbalanced PRBS generator 100 and the output 213 of the balanced generator 212.

Figure 4:
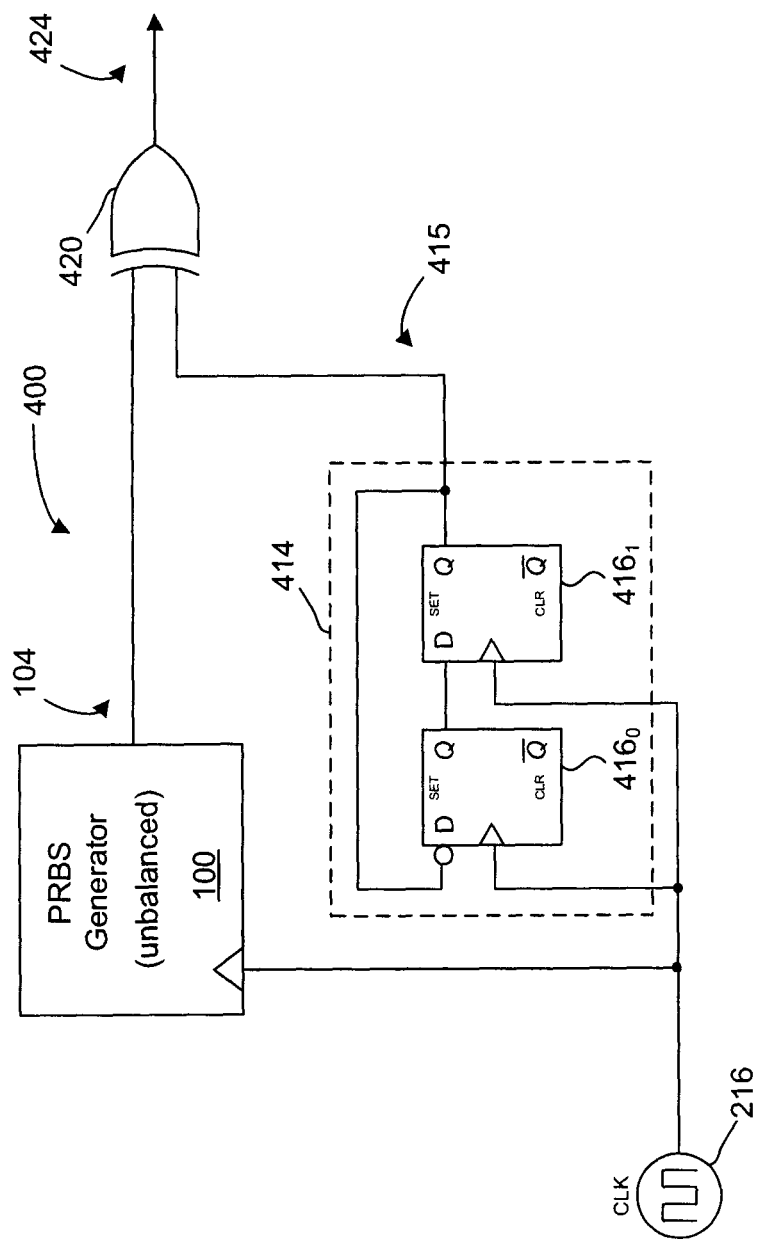
FIG. 4 shows a circuit diagram of a balanced PRBS generator in accordance with yet another example embodiment.

Reference will now be made to FIG. 4. FIG. 4 shows a circuit diagram of a balanced PRBS generator 400 in accordance with yet another example embodiment and similar to the PRBS generator 200 shown in FIG. 2. The primary difference between the two circuits is that it includes a balanced generator that is a divide-by-four circuit 414, whereas the generator 212 shown in FIG. 2 is divide-by-two circuit. As will be appreciated by one skilled in the art, the generator 414 is termed a divide-by-four circuit, because it outputs a signal that oscillates at a frequency that is ¼ the frequency of the clock signal received at the clock inputs of the flip-flops. Also, because the illustrated generator 414 is a divide-by-four circuit that generates an oscillating output signal having a 50% duty cycle, the sequence outputted at the output 415 of the generator 414 should have zero imbalance.

As will be appreciated by those skilled in the art, a single D flip-flop is used to implement a divide-by-two generator, whereas two D flip-flops $416_0$ and $416_1$ are included in the generator circuitry needed to implement a divide-by-four generator. The D flip-flop $416_0$ receives an inverted Q output of the D flip-flop $416_1$ at its D input, and the Q output of the D flip-flop $416_0$ is received at the D input of the D flip-flop $416_1$. The clock inputs of both the D flip-flops $416_0$ and $416_1$ receive the clock signal 216.

Similar to the configuration of the generator 200 shown in FIG. 2, the output 104 of the unbalanced generator and the output 415 of the balanced generator are received at one and the other of the two inputs of XOR logic gate 420. Circuit output 424 of the balanced PRBS generator 400 is the output of the XOR logic gate 420.

Although the generator 212 shown in FIG. 2 is a divide-by-two generator, and although the generator 414 shown in FIG. 4 is a divide-by-four generator, it will be understood that any one of a number of different possible sub-rate clocks could be used to implement a balanced, non-random generator used in a balanced PRBS generator in accordance with example embodiments.

It will be understood by those skilled in the art that the sequence repeat length for the generator 400 is twice the length as the sequence repeat length for the generator 200. In particular, the sequence repeat length for the generator 200 is $2^{N-1}*2$. The sequence repeat length for the generator 400 is $2^{N-1}*4$. The general formula for the sequence repeat length is $2^{N-1}*2^M$ (where M=number of flip-flops in the divide-by-[M*2] generator). [0033] In some examples, balanced PRBS generators in accordance with at least some example embodiments may be used within digital to analog converters. In other examples, balanced PRBS generators in accordance with at least some example embodiments may be used within analog to digital converters. In still other examples, balanced PRBS generators in accordance with at least some example embodiments may be used within delta sigma modulators.

Certain adaptations and modifications of the described embodiments can be made. Therefore, the above discussed embodiments are considered to be illustrative and not restrictive.

What is claimed is:

1. An electronic circuit for producing a digital output in response to edges of a received clock signal, the circuit comprising:
    first generator circuitry for generating an unbalanced, pseudo-random binary output of said first circuitry;
    second generator circuitry having an input for the received clock signal, said second circuitry generating a sub-rate clock version of the received clock; and
    logic gate circuitry for effectively multiplying said sub-rate clock with said pseudo-random binary output of the first circuitry to produce a balanced, pseudo-random binary output.

2. The electronic circuit of claim 1 wherein said sub-rate clock has a substantially 50 percent duty cycle.

3. The electronic circuit of claim 1 wherein the circuit produces a sequence of bits.

4. The electronic circuit of claim 1 wherein the circuit produces a word having a length of at least two bits.

5. The electronic circuit of claim 1 wherein said first circuitry comprises a number of D flip-flops.

6. The electronic circuit of claim 5 wherein said number of D flip-flops is at least seven D flip-flops arranged in a linear feedback shift register type arrangement.

7. The electronic circuit of claim 1 wherein said second circuitry comprises at least one flip-flop.

8. The electronic circuit of claim 7 wherein said at least one flip-flop is a single D flip-flop, the second circuitry configured for an inverted Q output of the D flip-flop to be received by the D input of the D flip-flop.

9. In an electronic circuit, a method for producing a varying digital output in response to edges of a received clock signal, the method comprising:
    generating, within circuitry of the electronic circuit, an unbalanced, pseudo-random binary output of the circuitry;
    generating, within the electronic circuit and from the received clock, a sub-rate clock version of the received clock; and
    carrying out, within the electronic circuit, an exclusive OR operation between said sub-rate clock and said pseudo-random binary output of the circuitry to produce a balanced, pseudo-random binary output.

10. The method of claim 9 wherein said sub-rate clock has a substantially 50 percent duty cycle.

11. The method of claim 9 wherein the varying digital output is a sequence of bits.

12. The method of claim 11 wherein said sequence has a repeat length that is a positive power of two.

13. The method of claim 9 wherein the varying digital output comprises a word having a length of at least two bits.

14. An electronic circuit for producing a digital output in response to edges of a received clock signal, the circuit comprising:
    first generating means that generates, within the electronic circuit, an unbalanced, pseudo-random binary output;
    second generating means that generates, within the electronic circuit and from the received clock, a sub-rate clock version of the received clock; and
    means for carrying out, within the electronic circuit, an exclusive OR operation between said sub-rate clock and said pseudo-random binary output to produce a balanced, pseudo-random binary output.

15. The electronic circuit of claim 14 wherein said sub-rate clock has a substantially 50 percent duty cycle.

16. The electronic circuit of claim 14 wherein the circuit produces a sequence of bits.

17. The electronic circuit of claim 14 wherein the circuit produces a word having a length of at least two bits.

18. The electronic circuit of claim 14 wherein said first generating means comprises a number of latch means.

19. The electronic circuit of claim 14 wherein said second generating means comprises at least one latch means.

20. The electronic circuit of claim 19 wherein said at least one latch means is a single latch means.

* * * * *